| United States Patent [19] | [11] 3,998,911 |
|---|---|
| Strametz et al. | [45] Dec. 21, 1976 |

[54] POLYPROPYLENE MOLDING COMPOSITION AND PROCESS FOR ITS PREPARATION

[75] Inventors: Helmut Strametz; Hans Joachim Leugering; Kurt Rust, all of Frankfurt am Main; Manfred Engelmann, Augsburg, all of Germany

[73] Assignee: Hoechst Aktiengesellschaft, Frankfurt am Main, Germany

[22] Filed: Apr. 7, 1975

[21] Appl. No.: 565,470

[30] Foreign Application Priority Data

Apr. 8, 1974 Germany .......................... 2417093

[52] U.S. Cl. ...................... 260/878 B; 260/897 A
[51] Int. Cl.$^2$ ................. C08F 297/08; C08L 23/12
[58] Field of Search .................... 260/878 B, 897 A

[56] References Cited

FOREIGN PATENTS OR APPLICATIONS

| 44-20751 | 9/1969 | Japan | 260/878 B |
|---|---|---|---|
| 44-20621 | 9/1969 | Japan | 260/878 B |

*Primary Examiner*—Alan Holler
*Attorney, Agent, or Firm*—Curtis, Morris & Safford

[57] ABSTRACT

A polypropylene molding composition having an excellent impact strength at a temperature down to −60° C and simultaneously a good hardness contains from 70 to 90% by weight of a polypropylene, 2 to 10% by weight of an ethylene propylene copolymer and 8 to 25% by weight of a polyethylene and is distinguished by a melt index MFI 230/5 lower than that of the polypropylene contained therein and simultaneously higher by the coefficient 1.3 to 7.0 than that of a polypropylene prepared in the presence of the same catalyst as the molding composition and having the same RSV.

7 Claims, No Drawings

POLYPROPYLENE MOLDING COMPOSITION AND PROCESS FOR ITS PREPARATION

It is known that ethylene, propylene and higher α-olefins as well as their mixtures may be polymerized in the presence of complex metal-organic mixed catalysts. For this purpose generally there are used combinations of compounds of elements of the first to the third main group with those of the fourth to the sixth subgroup of the Periodic Table. The molecular weight of polymers prepared in suspension, solution or in a gaseous phase in the presence of these catalysts may be influenced by the addition of suitable regulators as well as by the reaction temperature and may vary to an extent of from 50,000 to 5,000,00. There are known highly stereospecific catalyst systems that convert propylene to more than 95% isotactic, i.e. crystallisable polymer, by a suitable mode of carrying out the reaction. The avantageous mechanical properties such as a high hardness, stiffness and dimensional stability of articles made of such a material may be attributed to the high crystallinity. On the other hand the relatively high second order transition temperature Tg of the isotactic polypropylene at low temperatures causes a considerable decrease of impact strength, tensile strength and flexural strength, which may be obersved at a temperature of less than +10° C. This deficiency of the crystalline polypropylene makes it necessary to improve the impact strength at low temperatures by admixing therewith components which lose their elastic properties only when cooled to an essentially lower temperature. Ethylene propylene rubber (EPR) as well as polyethylene or combinations of these components are used above all as added elastomers for this purpose.

Such impact resistant mixtures of a low brittle point consisting of an essentially crystalline ethylene propylene copolymer containing a propylene homopolymer bloc and of an essentially linear polyethylene have already been described (cf. German Auslegeschrift No. 1,569,351).

The impact strenth of polypropylene at low temperatures may moreover be improved by preparing in situ mixtures thereof with portions of elastomers of a low second order transition temperature. This may be realised by adding in a controllable manner a suitable comonomer prior to, after or in the course of the homopolymerization of the propylene, whereby a copolymer and/or a second homopolymer is obtained. It is known, for example that propylene may be first polymerized alone until an essential part is transformed into polypropylene. Thereafter ethylene is introduced into the reaction mixture without removing the unpolymerized propylene, so that an ethylene propylene copolymer and polyethylene are formed (cf. British Patent Specification No. 970,479, U.S. Pat. Spec. Nos. 3,301,921; 3,378,608 and 3,454,675). It is true that molded articles prepared from polymer mixtures obtained in the aforesaid manner have an improved impact strength at temperatures down to −40° C, but their hardness is unsatisfactory.

It has now been found that a polypropylene molding composition having an excellent impact strength at a temperature down to −60° and at the same time a good hardness may be prepared by first converting propylene into a highly crystalline polypropylene, introducing ethylene into the reaction mixture at a certain propylene residual partial pressure in order to obtain an ethylene propylene copolymer having a non-uniform monomer distribution and terminating the polymerization after a considerable quantity of polyethylene has been formed.

The invention consequently relates to a polypropylene molding composition consisting of from
70 to 90% by weight of a polypropylene,
2 to 10% by weight of an ethylene propylene copolymer and of from
8 to 25% by weight of a polyethylene,
wherein the melting index MFI 230/5 is lower than that of the polypropylene contained therein and simultaneously higher by the coefficient 1.3 to 7.0 than that of a polypropylene prepared in the presence of the same catalyst as the molding composition and having the same reduced specific viscosity (RSV).

It is a further object of the invention to provide a process for preparing said polypropylene moding composition as well as a method of using it for preparing molded articles.

The molding composition according to the invention contains from
70 to 90, preferably from 75 to 85% by weight of polypropylene,
2 to 10, preferably from 3 to 8% by weight of ethylene propylene copolymer and from
8 to 25, preferably from 12 to 17% by weight of polyethylene in a finely dispersed form. The polypropylene is highly crystalline and has a melt index MFI 230/5 determined according to ASTM D 1238-62 T of from 5 to 80, preferably of from 10 to 50 g/10 minutes. The ethylene propylene copolymer has a reduced specific viscosity (RSV=$\eta$ spec./c) of at least 2.0 dl/g and a monomer distribution not completely uniform chemically. The polyethylene contained in the molding composition according to the invention contains up to 0.5% by weight of short chain branches in the form of incorporated propylene molecules. The melt index MFI 230/5 of the polypropylene molding composition is lower than that of its polypropylene portion and simultaneously higher by the coefficient 1.3 to 7.0, preferably of from 2.0 to 5.0 than that of a polypropylene prepared with the same catalyst system as the molding composition and having the same RSV.

The polypropylene molding composition has the great advantage that it may be directly used for preparing plastic articles owing to its coarse powdered character without previous homogenization in an extruder, kneader or similar apparatus. Owing to the fact that the melt index of the molding composition may vary within wide limits, it may be practically processed by all known methods for thermoplastics such as extruding, blowing of the extruded material, injection molding etc. The molded articles prepared by said process compared to molded articles prepared from a polypropylene of the same melt viscosity have a slightly reduced hardness, but an excellent impact strength at all temperatures down to −60° C.

In the process according to the invention for preparing the polypropylene molding composition according to the invention the monomer gases are added in three steps so that the polypropylene portion is in the range of from 70 to 90% by weight.

The polypropylene portion to be first prepared is highly crystalline, which property is obtained by using a considerably stereospecific catalyst system. For this purpose there may be used a combination of a TiCl$_3$ containing component prepared by reducing TiCl₄ with aluminium or aluminium diethylchloride or aluminium ethylsesquichloride and then submitting it to a thermal secondary treatment using aluminium diethylmonochloride as activator. A TiCl₃ component treated with a complexing compound may also be used or the stereospecific effect of the catalyst sytem may be improved by adding so-called third component to the polymerization mixture or both methods may be combined.

A suitable TiCl₃ component may be prepared, for example, by reducing titanium tetrachloride with aluminium diethylchloride or ethylsesquichloride at a temperature of from −10° to +5° C in an inert hydrocarbon, whereby a molar ratio of aluminium diethylchloride — being contained in the sesquichloride — to titanium tetrachloride of from 1.6 to 2.0, preferably of from 1.6 to 1.7 is maintained, and by heating subsequently the precipitate obtained for a certain period in an inert hydrocarbon and washing it several times with the same liquid after having separated the hydrocarbon in order to remove soluble by-products. The heating and washing process may be optionally repeated once or several times, while increasing the temperatures each time without exceeding 140° C.

A TiCl₃ containing catalyst component (in the example denominated K₁) especially suitable for preparing the molding composition according to the invention may be prepared as follows:

190 g of TiCl₄ in the form of a 48% solution in a benzine fraction having a boiling range of from about 140° to 170° C are introduced into a 6 l flask provided with a stirrer, a drip funnel and an inlet tube for nitrogen and cooled to −2° C. 393 ml of aluminium ethylsesquichloride (45.5% by weight of Al(C₂H₅)₂Cl), dissolved in 2.3 liters of the same benzine fraction are introduced thereto dropwise within 8 hours while stirring. The mixture obtained is allowed to stand for 2 hours at 0° C and for 12 hours at room temperature to finish the reaction. Thereafter the precipitate is washed with a fresh dispersing agent until the chlorine content of the overlying liquid decreases to less than 0.1% by weight. The suspension is then heated to 95° C while stirring and maintained at this temperature for 4 hours. After reflushing the solid material with fresh dispersing agent the reaction mixture is once more subjected to a heat treatment (10 hours at 110° C), whereupon the dispersing agent is replaced a last time. The content of TiCl₃ of the suspension is determined by means of a Ce-IV solution.

The catalyst component K2 used in some of the examples is prepared in the same manner, but by using 190 g of TiCl₄ and 221 ml of aluminium ethylsesquichloride.

Another TiCl₃ component may also be used, provided that it constitutes a highly stereospecific catalyst system in combination with the aforesaid activator, for example, commercial catalyst components of the composition TiCl₃ · ⅓ .

Such a TiCl₃ containing catalyst component may also be prepared in the following way: 1400 g of titanium tetrachloride are reacted with 27.0 g of metalic aluminium powder in the presence of 18.0 g of aluminium chloride in a stainless steel autoclave for 20 hours at 200° C. The unreacted titanium tetrachloride and the free aluminium chloride are removed from the reaction product by distillation at atmospheric pressure. The remaining solid matter is heated for 5 hours at 200° C at a reduced pressure of 0.2 mm Hg in order to completely remove the titanium tetrachloride. 570 g of a slightly purple colored compound containing titanium trichloride are obtained.

30 g of the compound obtained are placed in a cylindrical container of stainless steel having a capacity of 800 ml and ground for 24 hours in a nitrogen atmosphere in the presence of 100 balls of stainless steel having a diameter of 16 mm at a speed of 140 revolutions per minute until the X-ray diffraction pattern of the α- and γ-structure can no longer be identified.

Suitable complexing compounds for example are ethers, thioethers, thiols, phosphines, amines, amides, ketones, esters, especially ethers of the formula $$R - O - R$$

wherein R is an alkyl radical having from 1 to 15 carbon atoms. Suitable third components for improving the stereospecifity for example, are cyclopolyenes and phosphoric acid amides, especially cycloheptatriene and hexamethyl phosphoric acid trisamide.

The polymerization process according to the invention is effected in an inert diluent or in the gaseous phase. As diluents there may be used aliphatic or cycloaliphatic hydrocarbons such as pentane, hexane, heptane, cyclohexane, methylcyclohexane. Moreover there may be used aromatic hydrocarbons such as benzene or xylene, or benzine or hydrogenated diesel oil fractions which have been carefully freed from oxygen, sulfur compounds and humidity.

The catalyst concentration and the temperature and pressure conditions are chosen as for a propylene homopolymerization with the catalyst system used.

The polymerization is carried out at a pressure of from 0.5 to 40 kg/cm², preferably of from 1 to 35 kg/cm², the reaction temperature being in the range of from 40° to 110° C, preferably of from 50° to 90° C, especially of from 55° to 85° C. The individual polymerization steps may also be carried out at different temperatures. The molecular weight and consequently the melt viscosity of the polymer may be regulated by the choice of the reaction temperature and by using advantageously hydrogen admixed with the monomer to be introduced into the reaction mixture in such a quantity that from 0.1 to 20% by volume calculated on propylene or from 1 to 50% by volume calculated on ethylene are contained in the gas zone. In the second polymerization step however hydrogen is not generally added to the reaction mixture from the exterior. The quantity of the TiCl₃-containing catalyst component depends on the activity and on the reaction conditions, especially on the pressure and the temperature used. The molar ratio of TiCl₃ to aluminium dialkylmonochloride is in the usual range of from 1:1 to 1:5 depending on the purity of the monomer and the dispersing agent.

The ethylene propylene copolymer contained in the molding composition does not have a chemically completely uniform monomer distribution, i.e. it contains a portion of longer monomer sequences. This is obtained on the one hand by using a heterogeneous catalyst system and on the other hand by the fact that care is taken that the concentration of both monomers does not remain constant during the whole period of their presence in the reaction mixture, i.e. that the monomer proportion changes during the copolymerization period. When carrying out the reaction continuously, the aforesaid situation is obtained by copolymerizing in at least two cascade connected reactors wherein varying monomer concentrations are established, the propylene concentration in the second reactor being maintained at a lower level than that in the first reactor.

The most advantageous condition is to make sure that each catalyst particle has the possibility of forming a polymer grain of the composition according to the invention. This may be effected especially by copolymerizing the second monomer in a reactor system, wherein the residence time is very short, for example in a reaction tube having relatively little back flow, wherein the ethylene propylene proportion increases from the beginning to the end.

The reaction time required for preparing the ethylene propylene copolymer is short owing to its relatively small proportion by weight and the propylene quantity used is small, too. This means that ethylene may be introduced at a relatively low propylene partial pressure of less than 0.5, preferably of 0.3 kg/cm$^2$ when using a liquid hydrocarbon as reaction medium. Owing to the good solubility of the propylene the concentration is nevertheless sufficient for polymerizing.

The composition of the ethylene propylene copolymer and its proportion in the polypropylene molding composition depends on its intended use. Both factors may be influenced by the propylene residual content at the beginning of the ethylene propylene copolymerization and by the ethylene propylene molar ratio in the course of the copolymerization. This ratio may be in the range of from 90:10 to 25:75, preferably of from 85:15 to 40:60.

When the partial pressure of the propylene above the reaction mixture has decreased to less than 0.001 kg/cm$^2$, the preparation of polyethylene is started in a third step by introducing ethylene, which polyethylene has a small quantity of short chain branches because of the occasional incorportions of propylene molecules that are still present.

Working up of the suspension obtained at the end of the polymerization is effected in known manner, for example by treating it with a suitable alcohol capable of dissolving catalyst residues. The suspension may then be washed and dried, or the residues of dispersing agent are removed by a steam distillation followed by drying. Working up of the powder obtained in the polymerization in a gaseous phase is carried out in an analogous manner by suspending the powder in a hydrocarbon alcohol mixture.

Control of the polymerization reaction requires, besides the usual regulating and measuring devices for temperature, monomer gas and molecular weight, withdrawal of polymer samples and rapid determination of the melt indexes and RSV values, optionally after a previous treatment with acetone. This is a routine measurement which can be easily effected.

It is a great advantage of the process according to the invention that in the suspension process the quantity of soluble polymer contained in the dispersing agent as a result of the propylene homopolymerization only slightly increases in the course of the copolymerization.

The polypropylene molding composition according to the invention is characterized by a high hardness and toughness (=impact strength) at low temperature of the molded articles prepared thererfrom. It may be used wherever a high mechanical strength (in case of impact or shock) must be assured, for example in the processing by injection molding of containers for the transport and storage of deep frozen foodstuffs; for parts in the motor car industry (door handles, fittings, coverings, cases for batteries); in the processing by extrusion of sheets for packaging foodstuffs; for corrugated cardboard for preparing boxes for milk bottles and deep frozen foodstuffs; in the processing by blow moulding of the extruded material for bottles and containers for transport and storage (small and large volume containers).

Hardness is to be understood as the ball indentation hardness determined according to DIN 53,456 in kp/cm$^2$. The toughness is the impact strength determined according to British Standard 2782, part III, method 306 c. The results indicate the falling height of a weight of 1 kg, at which 50% of the tested materials still remain undamaged. These indications are in better conformity with practical conditions than the indications of the impact strength in mkg.

Deep temperatures mean temperatures down to −60° C, whereby the toughness properties are determined in comparison to values at +23° C, 0° C, −30° C and −60° C.

The RSV values are determined on solutions of 0.1% by weight of polymer in decahydronaphthalene at 135° C and indicated in deciliter per gram (dl/g).

The melt indexes MFI 230/5 are determined according to ASTM /D 1238-62/T.

The following examples illustrate the invention.

EXAMPLE 1

110 liters of a hydrogenated aliphatic hydrocarbon having a boiling point range of from 140° to 170° C were introduced into an enamelled 150 l vessel provided with an impeller stirrer, heated to 55° C and saturated with the monomer at a propylene pressure of 0.5 kg/cm$^2$.

Polymerization immediately started after 1 mole of aluminium diethylmonochloride (= 9 m-moles/l) and 0.44 moles of TiCl$_3$ of the TiCl$_3$ containing component K2 (= 4 m-moles/l) had been added. 32.4 kg of propylene (5.4 kg/h) were introduced in the course of 6 hours, to which hydrogen was added during the first 5 hours for regulating the molecular weight of the polypropylene formed. The average hydrogen concentration in the gas zone was 2.5% by volume (cf. table). Upon completing of the monomer admission the decrease in the propylene partial pressure was determined, whereas the total pressure in the vessel was maintained at 1.3 kg/cm$^2$ by means of nitrogen. A sample of the polymer suspension was withdrawn via a dip pipe shortly before the desired partial pressure was attained. The mother liquor was filtered off with suction immediately and its content of soluble polymer portions was determined by evaporation. The solid polymer was washed on a filter with acetone, mixed with a stabilizing solution (15 ml of CH$_2$Cl$_2$, 0.050 g of 4-hydroxy-3,5-ditertiary butyl-phenylpropionic acid stearyl ester and 0.025 g of thiopropionic acid lauryl ester per 10 g of polymer) in a plate glass pan and rapidly dried. Thereafter the melt index 230/5 and the RSV were determined, which were 12 g/ 10 minutes and 3.03 dl/g respectively. At a propylene residual partial pressure of 0.45 kg/cm$^2$ ($\hat{=}$ 0.6 kg of dissolved propylene) 2.5 kg of ethylene were homogenuously introduced into the reaction mixture for 60 minutes. A pressure increase could not be noticed during this period. The propylene content as determined by a gas analysis effected thereafter was less than 0.1% by volume.

In a third reaction step 4.6 kg of ethylene were introduced for 60 minutes, corresponding to 11.5% by weight of the total monomer quantity. Hydrogen was admixed with the monomer until its concentration in the gas zone was 3.5% by volume.

After completion of the monomer addition the pressure in the vessel was allowed to decrease below 1.2 kg/cm$^2$, at which point the reaction was interrupted by adding 6 liters of iso-propanol while destructing the catalyst.

In order to remove residues of the catalyst the reaction product was stirred for two and a half hours at 70° C and the organic phase was extracted four times with 35 liter of desalted water. Thereafter the polymer suspension was filtered and the polymer dried. The yield was 38 kg, the melt index MFI 230/5=4.4 g/10 minutes, the RSV = 4.36 dl/g and the content of the mother liquor of soluble polymer 2.6% by weight calculated on the total quantity of the polymer.

Table 1 shows the hardness and the impact strength.

EXAMPLES 2 and 3

Example 1 was repeated twice. The hydrogen partial pressure was increased each time in the first step of the polymerization so that a polypropylene having a lower molecular weight was obtained. The average molecular weight of the polymer mixture at the end of the second step, consequently, was lower, too. Further modification can be seen from Table 1.

EXAMPLES 4 to 6

The polymerizations were carried out in an analogous manner to example 1, with the modifications indicated in Table 1 in columns 3, 4, 5, 9, 13, 14 and 15. The TiCl$_3$ containing catalyst component used was the reaction product described above as K1.

EXAMPLE 7

Polymerization in the gaseous phase

In a horizontal 20 liter reactor provided with scraping stirrer blades 0.1 mole of TiCl$_3$ in the form of the component K1 as well as 0.25 mole of aluminium diethyl monochloride in a smaller quantity of pentane were added to 0.3 kg of an impact resistant polypropylene material previously prepared. The mixture was heated to 60° C while stirring and propylene was introduced for 4 hours (1.1 kg/h) with 0.2% by volume of H$_2$. The pressure increased to 17 kg/cm$^2$ at the end of the polymerization and was reduced to 4.5 kg/cm$^2$ by polymerization. The propylene partial pressure was adjusted to 0.45 kg/cm$^2$ by expanding the residual quantity of propylene and adding nitrogen. A polymer sample was withdrawn through a lock and ethylene was thereafter introduced, first alone for 5 minutes (1.4 kg/h) and after 30 minutes, together with 3% by volume of H$_2$ for 45 minutes. The hydrogen content was calculated such that the final melt index MFI 230/5 was reduced from 23 g/10 minutes in the polypropylene portion to 3.2 g/10 minutes. After terminating the polymerization the polymer mixture was withdrawn under nitrogen, and treated while stirring with 30 liter of an azeotropic mixture of 23% by weight of n-hexane and 77% by weight of iso-propanol for 1 hour at 65° C in a 70 liter vessel. The polymer powder was then separated from the dispersing agent on a pressure filter and dried under nitrogen. Its mechanical properties are indicated in Table 1.

COMPARATIVE EXAMPLE 1

110 liters of a hydrogenated aliphatic hydrocarbon having a boiling point range of from 140° to 170° C were introduced into the apparatus according to example 1, heated to 55° C and saturated with the monomer at a propylene pressure of 0.5 kg/cm$^2$. After having added 1 mole of aluminium diethylmonochloride (= 9 m-moles/l) and 0.44 moles of TiCl$_3$ of the TiCl$_3$ containing component K2 (= 4 moles/l) the polymerization immediately started. 27.8 kg of propylene (3 kg/h) were introduced in the course of 9 hours, to which hydrogen was added during the first 5 hours for controlling the molecular weight of the polypropylene formed. The average hydrogen concentration in the waste gas (30 liters/h) was 3.2% by volume (see table). After stopping the monomer admission the decrease of the propylene partial pressure was determined by measurement. Shortly before attaining a propylene partial pressure of 2.1 kg/cm$^2$ a sample of the polymer suspension was withdrawn and tested as described in example 1. The melt index was 29 g/10 minutes and the RSV 2.57 dl/g.

Thereafter 3.1 kg of ethylene was introduced homogenuously into the reaction mixture for 75 minutes. A pressure increase could not be noticed during this period: the propylene content of a gas analysis effected subsequently was below the identification limit of 0.1% by volume.

In the third reaction step 0.4 kg of ethylene were introduced for ten minutes corresponding to 1.3% by weight of the total monomer quantity. No hydrogen was admixed to the monomer.

After having added ethylene the reaction mixture was treated as described in example 1. The properties of the polymer mixture obtained are indicated in the table.

COMPARATIVE EXAMPLES 2 and 3

The reaction mixture ws treated in an analogous manner to example 1 (modifications see table), but the compolymerization was interrupted as soon as the propylene content in the reaction mixture was below 0.1% by volume so that the polymer mixture did not have a polyethylene portion.

COMPARATIVE EXAMPLE 4

The polymerization was started as in example 1, but ethylene was only introduced when the partial pressure of the propylene was below 0.001 kg/cm$^2$. Only a very small copolymer portion was formed so that the polymer mixture practically consisted only of polypropylene and polyethylene.

COMPARATIVE EXAMPLE 5

A polymer mixture was prepared under the conditions according to example 1, whereby the molecular weight of the propylene portion was reduced owing to the high hydrogen content in the first step and practically no hydrogen was present in the third step so that the molecular weight of the polyethylene portion was very high.

COMPARATIVE EXAMPLE 6

The polymerization was again carried out in an analogous manner to example 1, while maintaining a high hydrogen content in the monomer gas in the third step so that a polyethylene portion of a low molecular weight was obtained.

COMPARATIVE EXAMPLE 7

The example was carried out in an analogous manner to comparative example 6, but using the $TiCl_3$ component K1.

TABLE 1

Monomer addition and properties of the polymers

First step
propylene ($C_3$)=polymerization

| Example | $C_3$, kg./h. (1) | Total quantity of $C_3$, kg. (2) | $H_2$ in the gas zone, percent by volume (3) | End of the introduction of $C_3$ at kg./cm.² (4) | Final pressure, kg./cm.² (5) | Polypropylene MFI, g./10 min. (6) | RSV, dl./g. (7) |
|---|---|---|---|---|---|---|---|
| 1 | 5.5 | 33 | 2.5 | 2.75 | 0.45 | 12 | 3.03 |
| 2 | 5.5 | 33 | 3.2 | 2.4 | 0.42 | 28 | 2.48 |
| 3 | 5.5 | 33 | 6.1 | 2.5 | 0.28 | 79 | 1.88 |
| 4 | 5.5 | 33 | 3.5 | 2.5 | 0.34 | 38 | 2.41 |
| 5 | 5.5 | 33 | 3.5 | 2.5 | 0.30 | 40 | 2.30 |
| 6 | 5.5 | 33 | 4.2 | 2.7 | 0.37 | 73 | 1.90 |
| 7 | 1.1 | 4.4 | — | 17 | (5)0.45[1] | 23 | 2.52 |
| Comp. Ex. 1 | 3.0 | 27 | 3.2 | 2.4 | 2.1 | 29 | 2.57 |
| Comp. Ex. 2 | 3.0 | 27 | 2.6 | 2.6 | 2.2 | 14 | 2.81 |
| Comp. Ex. 3 | 3.0 | 27 | 3.2 | 2.4 | 2.1 | 29 | 2.52 |
| Comp. Ex. 4 | 5.5 | 33 | 3.9 | 2.9 | 0.001 | 52 | 2.24 |
| Comp. Ex. 5 | 5.5 | 33 | 8.3 | 3.6 | 0.37 | 118 | 1.77 |
| Comp. Ex. 6 | 5.5 | 33 | 4.1 | 2.1 | 0.34 | 6.6 | 3.28 |
| Comp. Ex. 7 | 5.5 | 33 | 1.8 | 2.1 | 0.30 | 4.8 | 3.39 |

TABLE 1-Continued

Second step
$C_3/C_2$=copolymerization

| Example | $C_2$, kg./h. (8) | $C_2$ total, kg. (9) | $C_3$ portion, percent by weight (10) | Copolymer RSV, dl./g. (11) | Percent by weight of total polymer (12) |
|---|---|---|---|---|---|
| 1 | 2.5 | 2.5 | 16 | 3.6 | 7.7 |
| 2 | 2.5 | 2.1 | 22 | 3.1 | 6.3 |
| 3 | 2.5 | 1.9 | 17 | 2.1 | 5.5 |
| 4 | 2.5 | 2.1 | 19 | 2.9 | 6.1 |
| 5 | 2.5 | 2.0 | 17 | 2.9 | 5.7 |
| 6 | 2.5 | 1.8 | 18 | 2.4 | 5.2 |
| 7 | 1.4 | 0.1 | 17 | 2.1 | 2.2 |
| Comp. Ex. 1 | 2.5 | 3.1 | 30 | 1.3 | 14 |
| Comp. Ex. 2 | 2.5 | 1.7 | 45 | 1.7 | 11 |
| Comp. Ex. 3 | 2.5 | 2.4 | 35 | 1.2 | 13 |
| Comp. Ex. 4 | 2.5 | 0.2 | — | — | 0.7 |
| Comp. Ex. 5 | 2.5 | 2.5 | 17 | 1.6 | 7.1 |
| Comp. Ex. 6 | 2.5 | 3.0 | 14 | 2.1 | 7.9 |
| Comp. Ex. 7 | 2.5 | 2.4 | 14 | 2.7 | 6.4 |

TABLE 1-continued

Third step
ethylene (=$C_2$)=polymerization

| Example | $C_2$, kg./h. (13) | $C_2$ total, kg. (14) | $H_2$ gas zone, percent by volume (15) | PE, percent by weight of total polymer (16) | Soluble polymer in mother liquor, percent by weight (17) |
|---|---|---|---|---|---|
| 1 | 4.6 | 4.6 | 11 | 11.5 | 2.6 |
| 2 | 2.5 | 7.1 | 28 | 17 | 3.2 |
| 3 | 2.5 | 6.7 | 23 | 16 | 2.9 |
| 4 | 2.5 | 7.1 | 31 | 17 | 4.1 |
| 5 | 2.5 | 7.1 | 20 | 17 | 4.4 |
| 6 | 2.5 | 7.1 | 27 | 17 | 3.6 |
| 7 | 1.4 | 1.0 | — | 20 | 4.2[2] |
| Comp. Ex. 1 | 2.5 | 0.4 | — | 1.3 | 3.8 |
| Comp. Ex. 2 | — | — | — | — | 3.2 |
| Comp. Ex. 3 | — | — | — | — | 1.5 |
| Comp. Ex. 4 | 2.5 | 10.3 | 3.9 | 24 | 2.4 |
| Comp. Ex. 5 | 2.5 | 7.0 | <0.1 | 16.5 | 3.9 |
| Comp. Ex. 6 | 2.5 | 8.3 | 44 | 19 | 4.1 |
| Comp. Ex. 7 | 2.5 | 6.7 | 33 | 15 | 3.7 |

TABLE 1-Continued

Properties of the moulding composition

| Example | MFI, g./10 min. | RSV, dl./g. | Ball indentation hardness, kg./cm.² | +23° C. cm. | Fall Test 0° C. cm. | −30° C. cm. | −60° C. cm. |
|---|---|---|---|---|---|---|---|
| | (18) | (19) | (20) | (21) | (22) | (23) | (24) |
| 1 | 4.4 | 4.36 | 630 | 180 | 150 | 115 | 70 |
| 2 | 11 | 3.80 | 650 | 190 | 155 | 120 | 50 |
| 3 | 22 | 3.19 | 685 | 145 | 115 | 85 | 45 |
| 4 | 9.3 | 4.13 | 675 | 185 | 155 | 130 | 60 |
| 5 | 12 | 4.05 | 675 | 170 | 150 | 135 | 70 |
| 6 | 21 | 3.45 | 685 | 150 | 135 | 120 | 65 |
| 7 | 3.2 | 4.14 | 640 | 190 | 170 | 110 | 45 |
| Comp. Ex. 1 | 2.0 | 3.98 | 500 | 170 | 160 | 120 | — |
| Comp. Ex. 2 | 12 | 2.95 | 580 | 140 | 120 | 60 | — |
| Comp. Ex. 3 | 17 | 2.78 | 610 | 135 | 115 | 60 | — |
| Comp. Ex. 4 | 19 | 3.70 | 720 | 110 | 85 | 15 | — |
| Comp. Ex. 5 | 1.6 | 3.68 | 630 | 160 | 130 | 105 | 15 |
| Comp. Ex. 6 | 25 | 4.00 | 600 | 150 | 135 | 110 | 20 |
| Comp. Ex. 7 | 4.9 | 5.19 | 630 | 165 | 115 | 80 | 25 |

[1] Vessel expanded from 5 to 0.45 kg./cm.²
[2] Heptane extract.

What is claimed is:

1. A polypropylene molding composition consisting essentially of a mixture of from 70 to 90% by weight of polypropylene, 2 to 10% by weight of an ethylene/propylene copolymer and 8 to 25% by weight of a polyethylene, the melt index MFI 230/5 of the molding composition being less than that of the polypropylene contained therein and greater by the coefficient 1.3 to 7.0 than that of the polypropylene prepared by means of the same catalyst as the molding composition and having the same RSV.

2. The polypropylene molding composition as claimed in claim 1, wherein the RSV of the ethylene propylene copolymer contained therein is at least 2.0 dl/g.

3. The polypropylene molding composition as claimed in claim 1, wherein the molar ratio of ethylene to propylene in the ethylene propylene copolymer is in the range of from 90:10 to 25:75.

4. A molded article made from the molding composition of claim 1.

5. A process for preparing a polypropylene molding composition consisting essentially of a mixture of 70 to 90% by weight of a polypropylene, 2 to 10% by weight of an ethylene/propylene copolymer and 8 to 25% by weight of a polyethylene, the melt index MFI 230/5 of the molding composition being less than that of the polypropylene contained therein and greater by the coefficient 1.3 to 7.0 than that of a polypropylene prepared by means of the same catalyst as the molding composition and having the same RSV, which comprises a. in a first step, polymerizing propylene at a pressure of from 0.5 to 40 kg/cm² and a temperature of from 40° to 110° C., in the presence of a highly stereo specific catalyst system and in the presence of from 0.1 to 20% by volume of hydrogen, based on the quantity of the propylene, to produce polypropylene having a melt index 230/5 of from 5 to 80 g/10 minutes, b. in a second step, starting the addition of ethylene at a propylene partial pressure of less than 0.5 kg/cm² and continuing to add ethylene at a pressure of from 0.5 to 40 kg/cm² and a temperature of from 40° to 110° C. to form an ethylene/propylene copolymer and c. in a third step, adding ethylene at a propylene partial pressure of less than 0.001 kg/cm², a total pressure of from 0.5 to 40 kg/cm² and a temperature of from 40° to 110° C. in the presence of from 1 to 50% by volume of hydrogen to form a polyethylene.

6. A continuous process for preparing a polypropylene molding composition consisting essentially of a mixture of from 70 to 90% by weight of a polypropylene, 2 to 10% by weight of an ethylene/propylene copolymer and 8 to 25% by weight of a polyethylene, the melt index MFE 230/5 of the molding composition being less than that of the polypropylene contained therein and greater by the coefficient 1.3 to 7.0 than that of a polypropylene prepared by means of the same catalyst as the molding composition and having the same RSV, which comprises a. in a first step, polymerizing propylene at a pressure of from 0.5 to 40 kg/cm² and a temperature of from 40° to 110° C., in the presence of a highly stereospecific catalyst system and in the presence of from 0.1 to 20% by volume of hydrogen, based on the quantity of the propylene, to produce polypropylene having a melt index 230/5 of 5 to 80 g/10 minutes, b. in a second step, starting the addition of ethylene at a propylene partial pressure of less than 0.5 kg/cm² and continuing to add ethylene at a pressure of from 0.5 to 40 kg/cm² and a temperature of from 40° to 110° C. to form an ethylene/propylene copolymer, said second step being carried out in two sequential polymerization stages with the propylene concentration in the second stage being lower than that in the first stage and c. in a third step, adding ethylene at a propylene partial pressure of less than 0.001 kg/cm², a total pressure of from 0.5 to 40 kg/cm² and a temperature of from 40° to 110° C. in the presence of from 1 to 50% by volume of hydrogen to form a polyethylene.

7. A process for preparing a polypropylene molding composition consisting essentially of a mixture of from 70 to 90% by weight of a polypropylene, 2 to 10% by weight of an ethylene/propylene copolymer and 8 to 25% by weight of a polyethylene, the melt index MFE 230/5 of the molding composition being less than that of the polypropylene contained therein and greater by the coefficient 1.3 to 7.0 than that of a polypropylene prepared by means of the same catalyst as the molding composition and having the same RSV, which comprises a. in a first step, polymerizing propylene at a pressure of from 0.5 to 40 kg/cm² and a temperature of from 40° to 110° C., in the presence of a highly stereospecific catalyst system and in the presence of from 0.1 to 20% by volume of hydrogen, based on the quantity of the propylene, to produce polypropylene having a melt index 230/5 of from 5 to 80 g/10 minutes, b. in a second step, starting the addition of ethylene at a propylene partial pressure of less than 0.5 kg/cm² and continuing to add ethylene at a pressure of from 0.5 to 40 kg/cm² and a temperature of from 40° to 110° C. to form an ethylene/propylene copolymer, the polymerization being carried out in a reaction tube having relatively little back flow and the ethylene being so added as to produce a progressive increase in ethylene concentration in the tube, and c. in a third step, adding ethylene at a propylene partial pressure of less than 0.001 kg/cm², a total pressure of from 0.5 to 40 kg/cm² and a temperature of from 40 to 110° C. in the presence of from 1 to 50% by volume of hydrogen to form polyethylene.

* * * * *